US010028321B2

(12) United States Patent
Lee et al.

(10) Patent No.: US 10,028,321 B2
(45) Date of Patent: Jul. 17, 2018

(54) INTERCONNECTING DEVICE AND IOT SYSTEM USING THE SAME

(71) Applicant: HON HAI PRECISION INDUSTRY CO., LTD., New Taipei (TW)

(72) Inventors: Horng-Juing Lee, New Taipei (TW);
Yu-Chien Hsiao, New Taipei (TW);
Shu-Fen Chen, New Taipei (TW);
Tien-Ping Liu, New Taipei (TW);
Yu-Tai Hung, New Taipei (TW);
Fu-Hsiung Yang, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 15/248,347

(22) Filed: Aug. 26, 2016

(65) Prior Publication Data
US 2018/0035479 A1    Feb. 1, 2018

(30) Foreign Application Priority Data

Jul. 27, 2016 (TW) .............................. 105123810 A

(51) Int. Cl.
| H04W 72/00 | (2009.01) |
| H04W 76/14 | (2018.01) |
| H04W 76/02 | (2009.01) |
| H04L 29/08 | (2006.01) |
| H04W 4/00 | (2018.01) |
| H04W 4/80 | (2018.01) |
| H04W 84/12 | (2009.01) |

(52) U.S. Cl.
CPC ............. *H04W 76/14* (2018.02); *H04L 67/10* (2013.01); *H04L 67/14* (2013.01); *H04L 67/34* (2013.01); *H04W 4/008* (2013.01); *H04W 4/80* (2018.02); *H04W 76/023* (2013.01); *H04W 84/12* (2013.01)

(58) Field of Classification Search
CPC ... H04W 76/023; H04W 4/008; H04W 84/12; H04L 67/10; H04L 67/14; H04L 67/34
USPC ........................................................ 455/452.1
See application file for complete search history.

(56) References Cited

U.S. PATENT DOCUMENTS

| 8,385,971 | B2* | 2/2013 | Rhoads | ............. G06F 17/30244 382/162 |
| 8,447,863 | B1* | 5/2013 | Francis, Jr. | ........ G06F 17/30542 707/724 |
| 2013/0297330 | A1* | 11/2013 | Kamen | .................. G06F 19/323 705/2 |
| 2013/0317753 | A1* | 11/2013 | Kamen | ............... G06F 19/3412 702/19 |

(Continued)

*Primary Examiner* — Marceau Milord
(74) *Attorney, Agent, or Firm* — ScienBiziP, P.C.

(57) ABSTRACT

The disclosure relates to an interconnecting device and system of IOT (Internet of Things). The interconnecting device is configured to interconnect different IOT platforms or interconnect a IOT platform with a robot. The interconnecting device comprises a hardware and a software comprising a control module, a communication module and a conversion module. The conversion module is configured to convert the message between different IOT platforms or between the IOT platform and the robot. The system of IOT comprises at least one IOT platform and the interconnecting device. The interconnecting device can interconnect different IOT platforms or interconnect a IOT platform with a robot conveniently.

19 Claims, 10 Drawing Sheets

(56) References Cited

U.S. PATENT DOCUMENTS

| | | | |
|---|---|---|---|
| 2015/0271557 A1* | 9/2015 | Tabe | H04N 21/4788 725/14 |
| 2015/0290795 A1* | 10/2015 | Oleynik | G05B 19/42 700/257 |
| 2015/0334554 A1* | 11/2015 | Song | H04W 8/205 455/558 |
| 2016/0059412 A1* | 3/2016 | Oleynik | B25J 9/163 700/257 |
| 2016/0142891 A1* | 5/2016 | Virhia | G06Q 10/00 340/870.07 |
| 2016/0253669 A1* | 9/2016 | Yoon | G06Q 20/4014 705/75 |
| 2016/0253670 A1* | 9/2016 | Kim | G06Q 20/4012 705/72 |
| 2017/0086204 A1* | 3/2017 | Jung | H04W 16/28 |
| 2017/0205897 A1* | 7/2017 | Chun | G06F 3/03 |

* cited by examiner

| Alljoyn nitification message arguments | |
|---|---|
| Parameter name | Data type |
| version | short |
| msgId | integer |
| msgType | short |
| deviceId | string |
| deviceName | string |
| AppId | array of bytes |
| appName | string |
| attributes attrName | string |
| attrValue | variant |
| customAttribute:attrName | string |
| attrValue | variant |
| langText | string |

| ROS message arguments | | |
|---|---|---|
| Parameter name | Data type | Description |
| topic | string | rostopicrostopic e.g. /alljoyn |
| msg | string | msg 0 for raise hands 1 for lay down hans 2 for dance |

FIG. 7

INTERCONNECTING DEVICE AND IOT SYSTEM USING THE SAME

CROSS-REFERENCE TO RELATED APPLICATIONS

This application claims all benefits accruing under 35 U.S.C. § 119 from Taiwan Patent Application No. 105123810, filed on Jul. 27, 2016, in the Taiwan Intellectual Property Office, the contents of which are hereby incorporated by reference.

FIELD

The subject matter herein generally relates to internet of things (IOT), particularly, to an interconnecting device and method for interconnection between different internets of things or between internet of things and intelligent robot.

BACKGROUND

The IOT is the network of physical devices, vehicles, buildings and other items embedded with electronics, software, sensors, actuators, and network connectivity that enable these objects to collect and exchange data. The physical devices includes radio frequency identification (RFID) device, infrared sensor, global positioning system (GPS), laser scan device.

Intelligent robots usually include sensors, actuators and a robot operating system (ROS) to interconnect the sensors and actuators of the robot. The sensors such as the image sensor or the tactile sensor can only detect limited information of the surrounding environment. If the intelligent robot can be communicated with the IOT and read the messages of the IOT, the intelligent robot can understand more of the surrounding environment. However, the ROS of the intelligent robot and the IOT platform are incompatibility.

What is needed, therefore, is to provide an interconnecting device which can overcome the shortcomings as described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

FIG. 7 is a schematic view of the second embodiment of how an interconnecting device converts the first messages of an AllJoyn IOT platform to the second messages that can be known by the ROS of intelligent robot.

DETAILED DESCRIPTION

Figure 1:
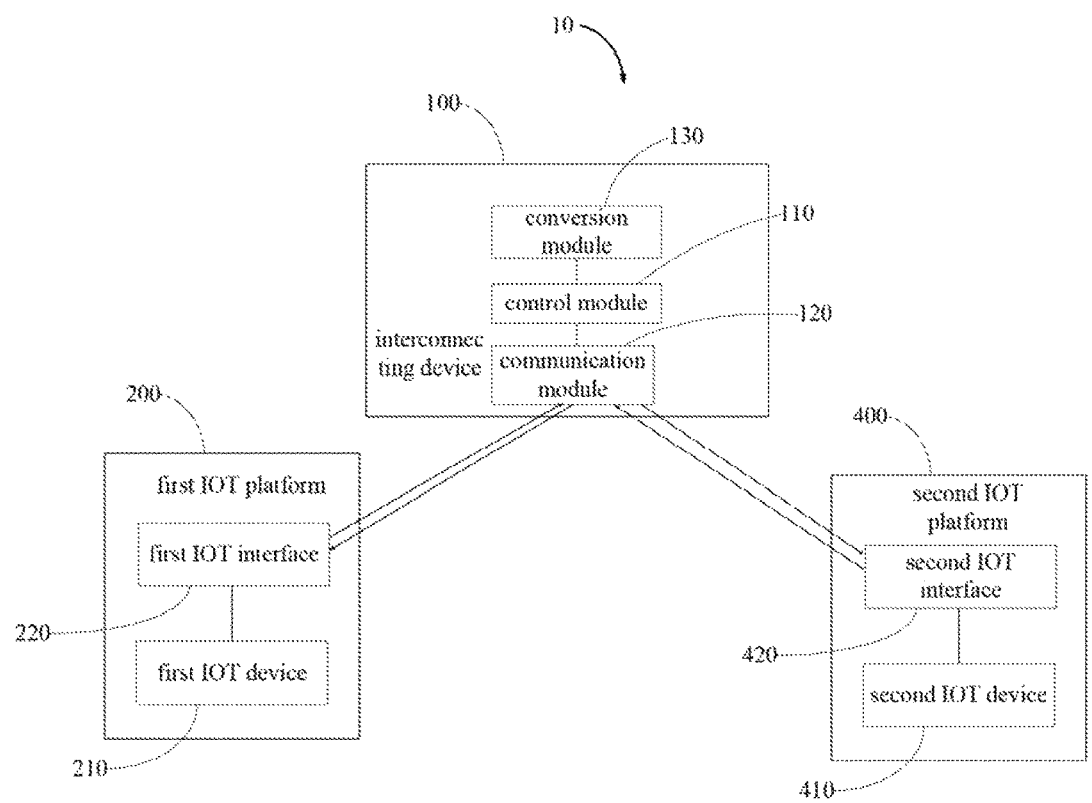
FIG. 1 is a functional diagram of a first embodiment of an IOT system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated tter illustrate details and features. The description is not to considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

Referring to FIG. 1, an IOT system 10 of the first embodiment is provided. The IOT system 10 includes an interconnecting device 100, a first IOT platform 200, and a second IOT platform 400. The interconnecting device 100 is configured to interconnect the first IOT platform 200 and the second IOT platform 400.

The interconnecting device 100 includes a software and a hardware configured to run the software. The hardware includes a processor and a communication device such as a transmitter and a receiver. The processor can be an integrated circuit (IC). The communication device can be wire or wireless communication device. The software includes a control module 110, a communication module 120 and a conversion module 130. The communication module 120 and the conversion module 130 are coupled with the control module 110.

The control module 110 is configured to control the interconnecting device 100. The communication module 120 is configured to control the communication device to transmit or receive messages. Thus, the interconnecting device 100 can communicate with the first IOT platform 200 and the second IOT platform 400. The communication module 120 can be a wire communication module such as an USB communication module, or a wireless communication module such as bluetooth communication module, infrared communication module, Wi-Fi communication module or radio frequency identification (RFID) communication module. The conversion module 130 is configured to convert the message between the first IOT platform 200 and the second IOT platform 400. For example, the conversion module 130 is configured to convert the first message of the first IOT platform 200 to the second message that can be known by the second IOT platform 400. The conversion module 130 also ca be configured to convert the second message of the second IOT platform 400 to the first message that can be known by the first IOT platform 200.

The interconnecting device 100 can be an intelligent mobile phone, a tablet computer, a note book computer, a desktop computer, a tiny computer or an intelligent robot. The tiny computer can be a Raspberry Pi or Banana Pi. In one embodiment, the interconnecting device 100 is a Raspberry Pi installed Linux system and acorn RISC machine (ARM) processor. The Raspberry Pi looks like a credit card, but has an operational performance as strong as the intelligent mobile phone. The Raspberry Pi has a USB interface for keyboard and mouse, and Ethernet interface, SD card expansion interface and high definition multimedia interface for display device and TV device.

The first IOT platform 200 and the second IOT platform 400 can be any type of IOT platform created by any business or organization, such as Thread, AllJoyn, OIC, Bonjour et al. The devices of the same IOT platform are compatible and can be communicated with each other so that to simplify operation and optimize user experience. The first IOT platform 200 and the second IOT platform 400 have a communication mechanism, such as MQTT, to publish a topic and subscribe a topic. For example, the AllJoyn IOT platform have a communication mechanism of sessionless notification service to send a notification and receive a notification.

The first IOT platform 200 includes a first IOT device 210 and a first IOT interface 220 electrically connected to the first IOT device 210. The first IOT platform 200 can be communicated with the interconnecting device 100 through the first IOT interface 220. The second IOT platform 400 includes a second IOT device 410 and a second IOT interface 420 electrically connected to the second IOT device 410. The second IOT platform 400 can be communicated with the interconnecting device 100 through the second IOT interface 420. In one embodiment, the first IOT platform 200 is an AllJoyn platform, and the first IOT interface 220 is an AllJoyn interface. The second IOT platform 400 is a Thread platform, and the second IOT platform 400 is a Thread interface.

Figure 2:
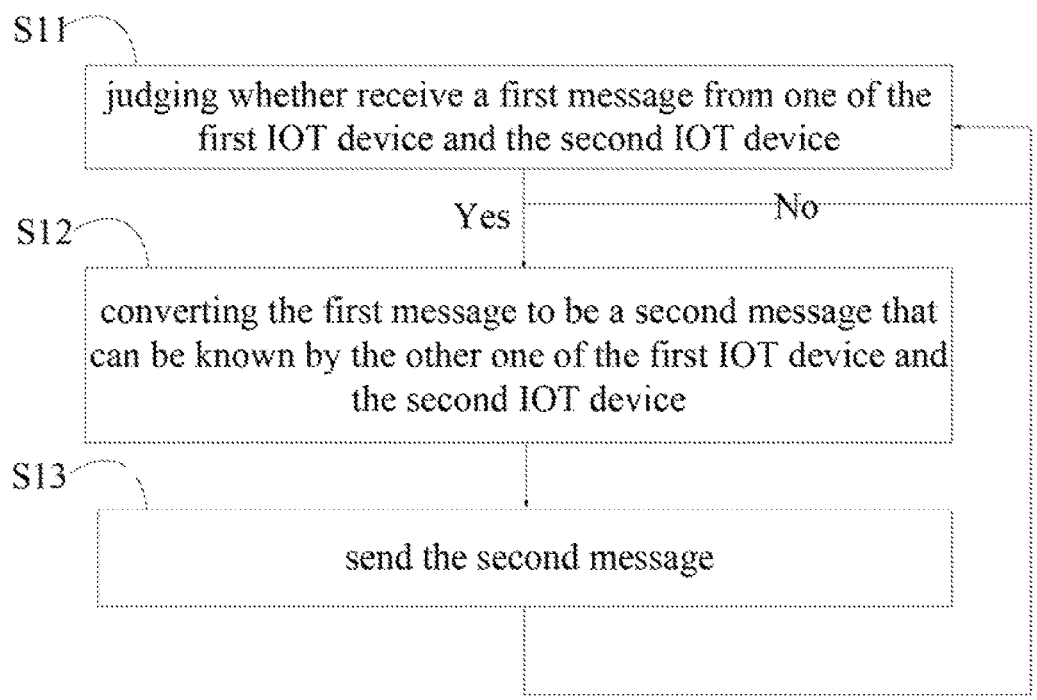
FIG. 2 is a flow chart of the first embodiment of an interconnecting method of an interconnecting device.

Referring to FIG. 2, an interconnecting method of the interconnecting device 100 of the first embodiment includes following steps:

step S11, judging whether receive a first message from one of the first IOT device 210 and the second IOT device 410, if yes, go to step S12, if no, repeating step S11;

step S12, converting the first message to a second message that can be known by the other one of the first IOT device 210 and the second IOT device 410, and go to step S13; and step S13, send the second message and back to step S11.

Figure 3:
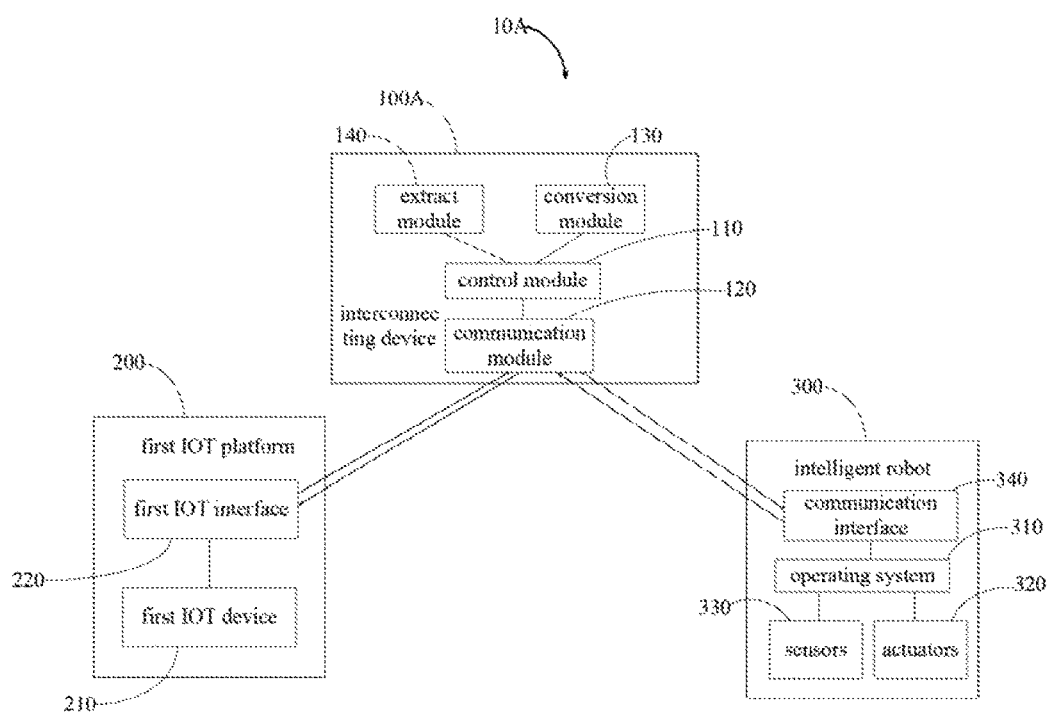
FIG. 3 is a functional diagram of a second embodiment of an IOT system.

Referring to FIG. 3, an IOT system 10A of the second embodiment is provided. The IOT system 10A includes an interconnecting device 100A, the first IOT platform 200, and an intelligent robot 300. The IOT system 10A can further include the second IOT platform 400 or other IOT platform.

The IOT system 10A is similar to the IOT system 10 above except that the IOT system 10A includes the intelligent robot 300, and the interconnecting device 100A includes an extract module 140. The interconnecting device 100A is configured to interconnect the first IOT platform 200 and the intelligent robot 300.

The intelligent robot 300 includes operating system 310, actuators 320, sensors 330 and communication interface 340. The intelligent robot 300 can be wire or wireless coupled with the interconnecting device 100A through the communication interface 340.

The extract module 140 is configured to extract command message from the first IOT platform 200 or the intelligent robot 300. The command message includes all messages that asks the intelligent robot 300 or the intelligent device, such as intelligent furnishing or intelligent electric equipment, of the first IOT platform 200 to perform an action.

Figure 4:
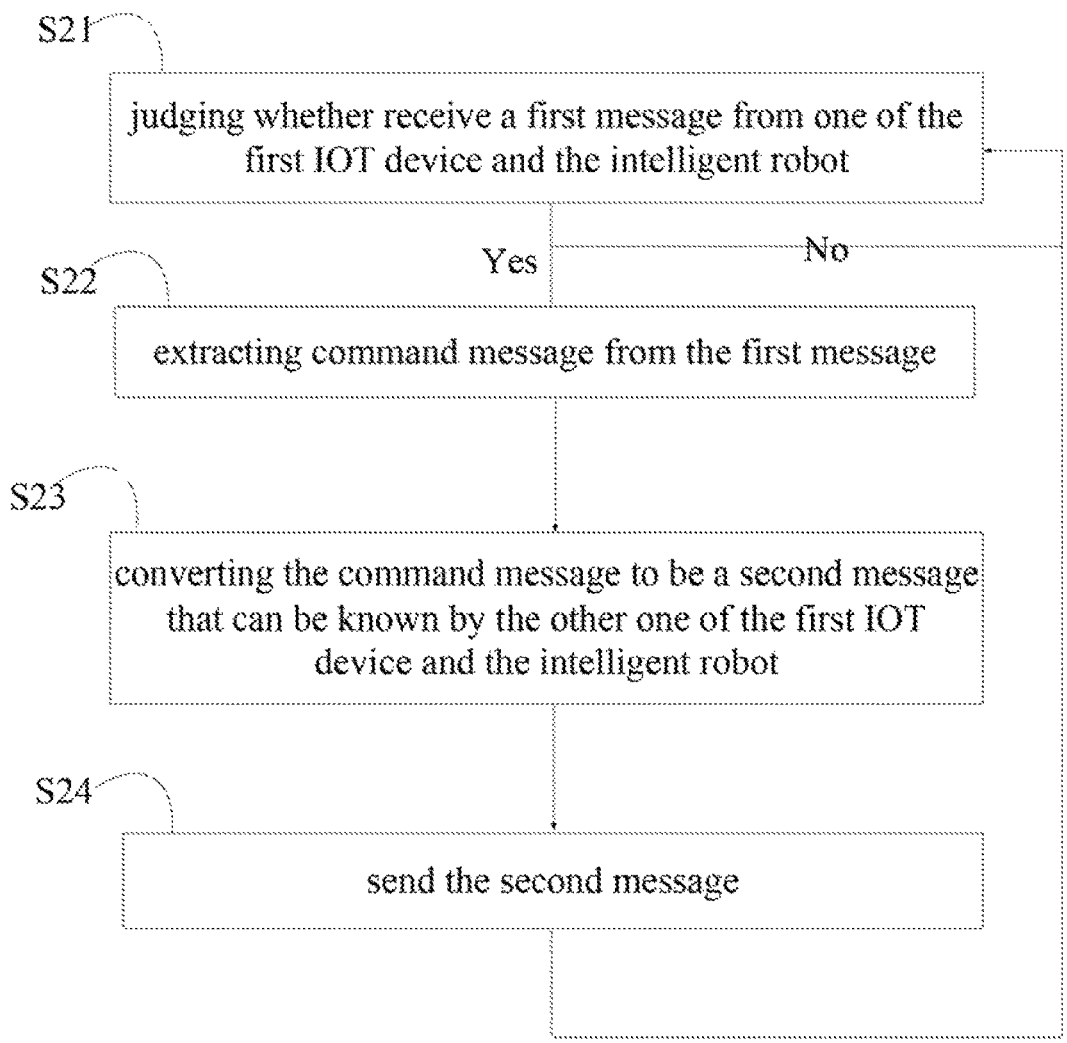
FIG. 4 is a flow chart of the second embodiment of an interconnecting method of an interconnecting device.

Referring to FIG. 4, an interconnecting method of the interconnecting device 100A of the second embodiment includes following steps:

step S21, judging whether receive a first message from one of the first IOT device 210 and the intelligent robot 300, if yes, go to step S22, if no, repeating step S21;

step S22, extracting command message of the first message, and go to step S23;

step S23, converting the command message to a second message that can be known by the other one of the first IOT device 210 and the intelligent robot 300, and go to step S24; and step S24, send the second message and back to step S21.

The step S22 is optional. The interconnecting device 100A directly converts the first message to the second message and send it out.

Figure 5:
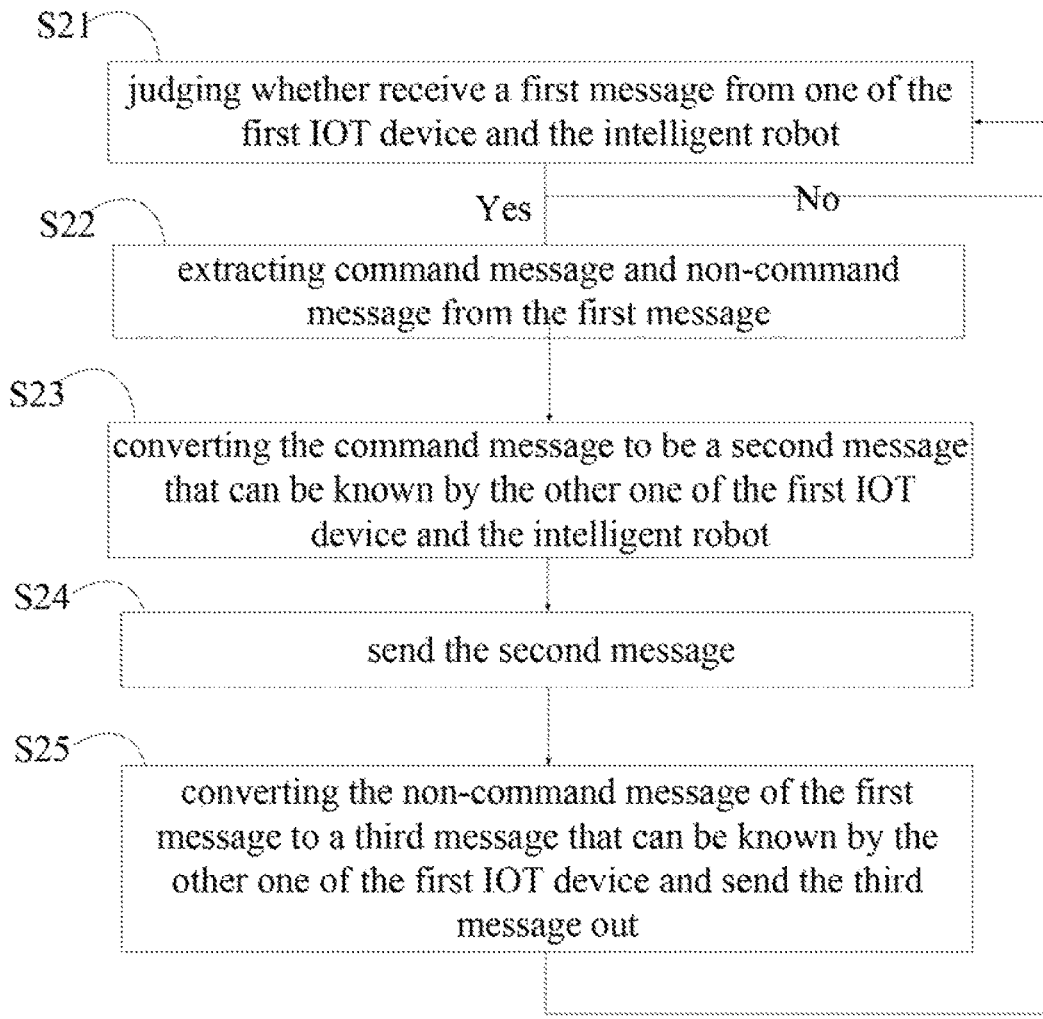
FIG. 5 is a flow chart of the second embodiment of another interconnecting method of an interconnecting device.

Referring to FIG. 5, another interconnecting method of the interconnecting device 100A of the second embodiment can includes following steps:

step S21, judging whether receive a first message from one of the first IOT device 210 and the intelligent robot 300, if yes, go to step S22, if no, repeating step S21;

step S22, extracting command message and non-command message of the first message, and go to step S23;

step S23, converting the command message to a second message that can be known by the other one of the first IOT device 210 and the intelligent robot 300, and go to step S24;

step S24, send the second message, and go to step S25; and step S25, converting the non-command message of the first message to a third message that can be known by the other one of the first IOT device 210 and send the third message out, and back to step S21.

Figure 6:
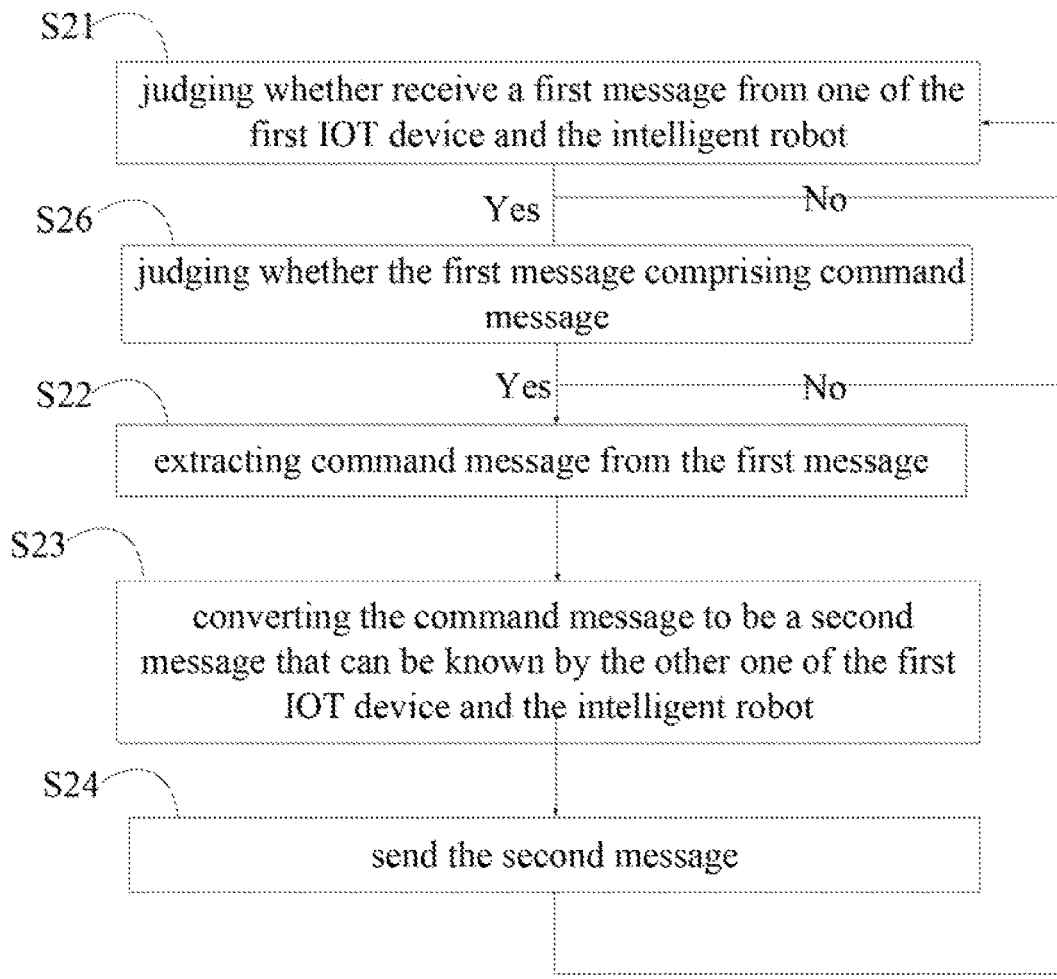
FIG. 6 is a flow chart of the second embodiment of another interconnecting method of an interconnecting device.

Referring to FIG. 6, another interconnecting method of the interconnecting device 100A of the second embodiment includes following steps:

step S21, judging whether receive a first message from one of the first IOT device 210 and the intelligent robot 300, if yes, go to step S26, if no, repeating step S21;

step S26, judging whether the first message comprising command message, if yes, go to step S22, if no, back to step S21;

step S22, extracting command message of the first message, and go to step S23;

step S23, converting the command message to a second message that can be known by the other one of the first IOT device 210 and the intelligent robot 300, and go to step S24; and step S24, send the second message and back to step S21.

FIG. 7 shows how the interconnecting device 100A converts the first messages of the AllJoyn first IOT platform 200 to the second messages that can be known by the operating system 310 of the intelligent robot 300.

Figure 8:
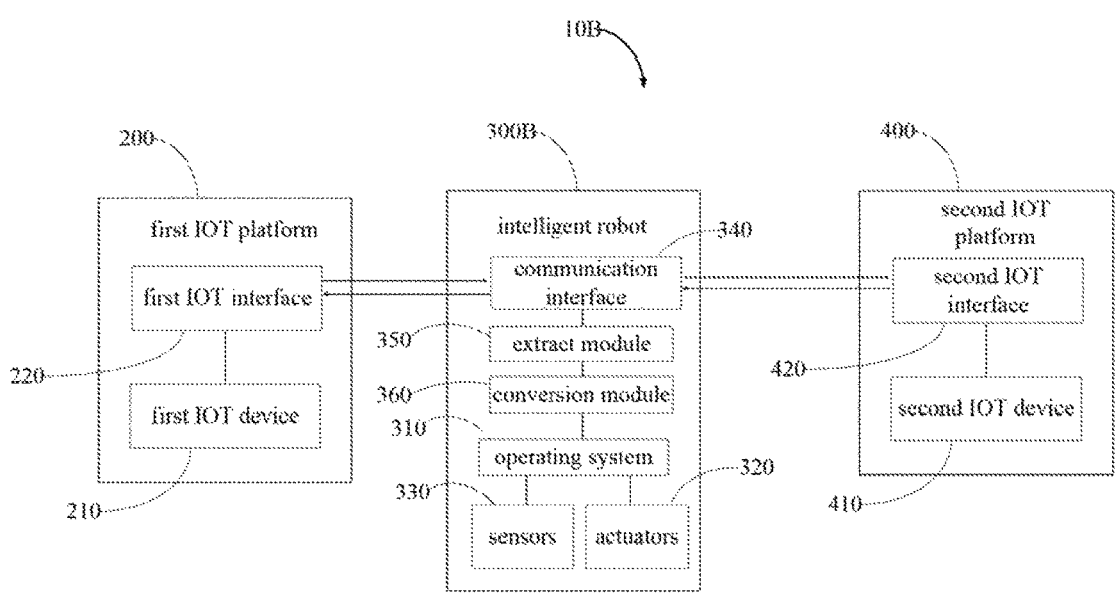
FIG. 8 is a functional diagram of a third embodiment of an IOT system.

Referring to FIG. 8, an IOT system 10B of the third embodiment is provided. The IOT system 10B includes the first IOT platform 200, an intelligent robot 300B, and the second IOT platform 400.

The IOT system 10B is similar to the IOT system 10 above except that the interconnecting device 100 is the intelligent robot 300B. The intelligent robot 300B is configured to interconnect the first IOT platform 200 and the second IOT platform 400.

The intelligent robot 300B is similar to the intelligent robot 300 above except that further includes an extract module 350 and a conversion module 360. The extract module 350 and the conversion module 360 are the same as the extract module 140 and a conversion module 130 above. The extract module 350 and the conversion module 360 are controlled by the operating system 310.

Figure 9:
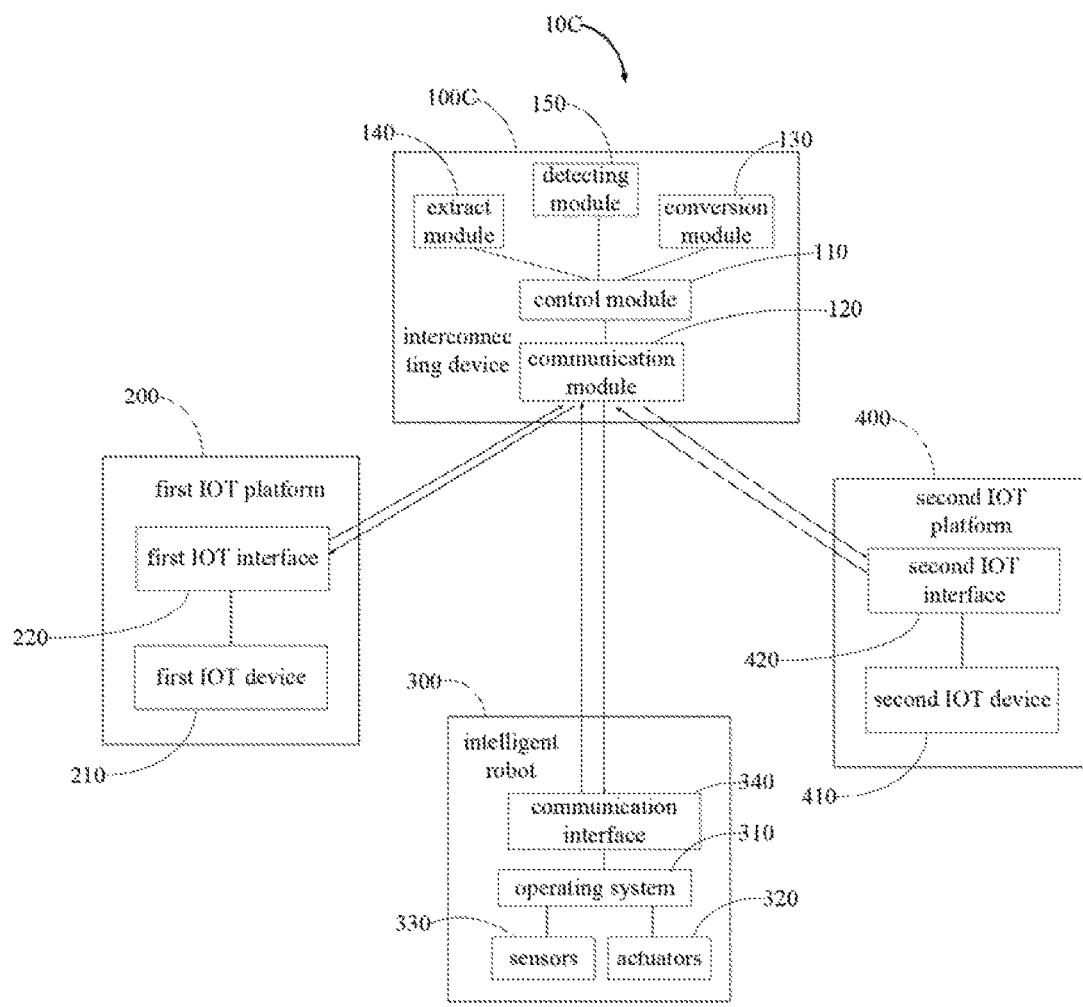
FIG. 9 is a functional diagram of a fourth embodiment of an IOT system.

Referring to FIG. 9, an IOT system 10C of the fourth embodiment is provided. The IOT system 10C includes an interconnecting device 100C, the first IOT platform 200, the intelligent robot 300 and the second IOT platform 400.

The IOT system 10C is similar to the IOT system 10 above except that further includes the intelligent robot 300. The interconnecting device 100C is similar to the interconnecting device 100 above except that further includes a detecting module 150 configured to detect whether receive a starting command or stopping command. The interconnecting device 100C is configured to interconnect any two of the first IOT platform 200, the intelligent robot 300 and the second IOT platform 400.

Figure 10:
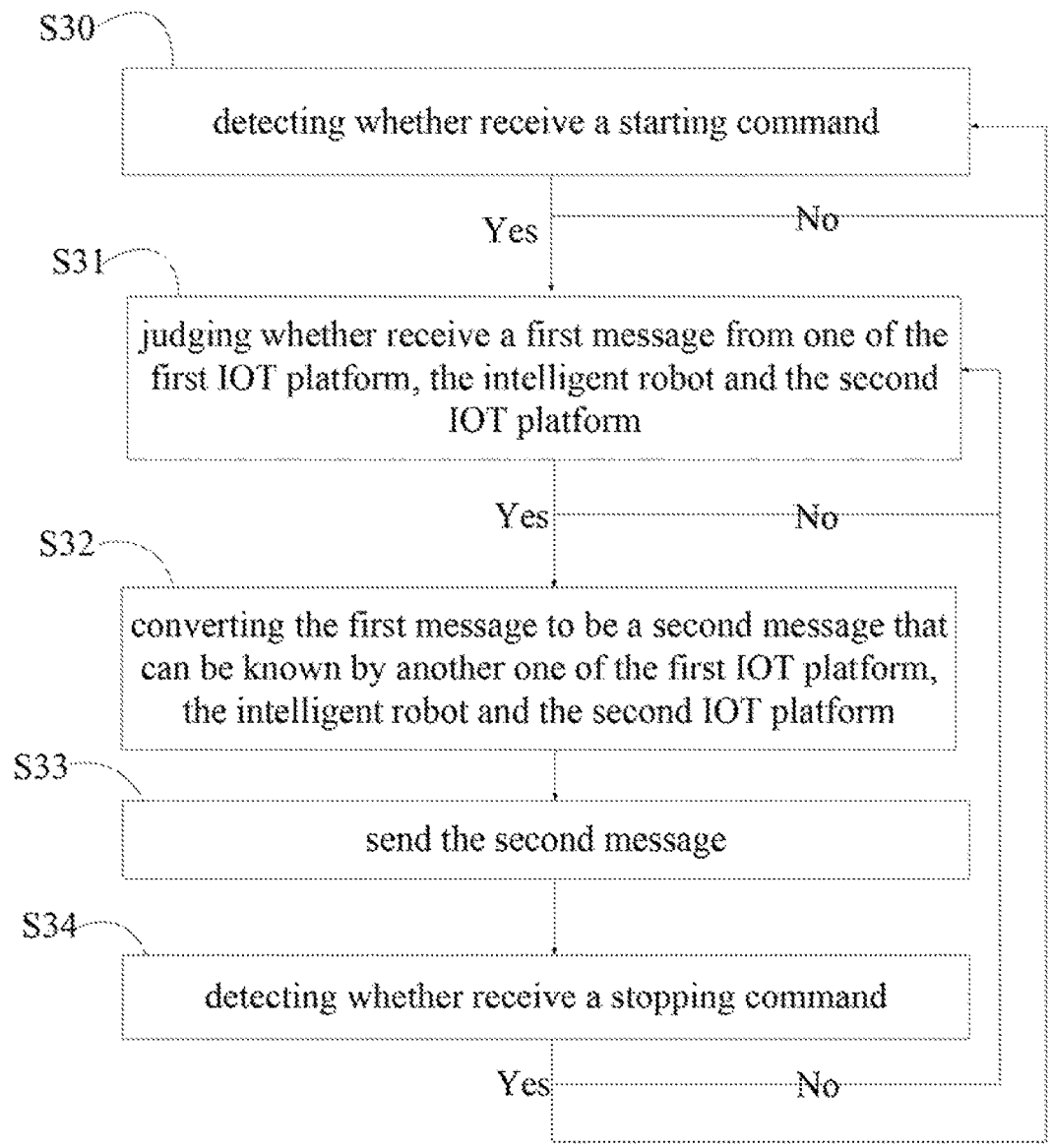
FIG. 10 is a flow chart of the fourth embodiment of an interconnecting method of an interconnecting device.

Referring to FIG. 10, an interconnecting method of the interconnecting device 100C of the fourth embodiment includes following steps:

step S30, detecting whether receive a starting command, if yes, go to step S31, if no, repeating step S30;

step S31, judging whether receive a first message from one of the first IOT platform 200, the intelligent robot 300 and the second IOT platform 400, if yes, go to step S32, if no, repeating step S31;

step S32, converting the first message to a second message that can be known by another one of the first IOT platform 200, the intelligent robot 300 and the second IOT platform 400, and go to step S33;

step S33, send the second message and go to step S34;

step S34, detecting whether receive a stopping command, if yes, back to step S30, if no, back to step S31.

The embodiments shown and described above are only examples. Even though numerous characteristics and advantages of the present technology have been set forth in the forego description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Depending on the embodiment, certain of the steps of methods described may be removed, others may be added, and the sequence of steps may be altered. The description and the claims drawn to a method may include some indication in reference to certain steps. However, the indication used is only to viewed for identification purposes and not as a suggestion as to an order for the steps.

What is claimed is:

1. An interconnecting device, comprising a software and a hardware configured to run the software, wherein the software comprises:

a control module configured to control the interconnecting device;

a communication module configured to communicate with one of a first internet of things (IOT) platform, a second IOT platform and an intelligent robot;

a conversion module configured to convert a first message from one of the first IOT platform, the second IOT platform, and the intelligent robot to a second message that can be known by another one of the first IOT platform, the second IOT platform, and the intelligent robot; and a detecting module configured to detect whether a starting command or a stopping command is received; wherein the interconnecting device is configured to perform an interconnecting method comprising:

step S30, detecting whether a starting command is received, when the starting command is received, go to step S31, when the starting command is not received, repeating step S30;

step S31, judging whether the first message is received, when the first message is received, go to step S32, when the first message is not received, repeating step S31;

step S32, converting the first message to the second message, and go to step S33;

step S33, send the second message and go to step S34;

step S34, detecting whether the stopping command is received, when the stopping command is received, back to step S30, when the stopping command is not received, back to step S31.

2. The interconnecting device of claim 1, wherein the interconnecting device is configured to perform an interconnecting method comprising:

step S11, judging whether the first message is received, when the first message is received, go to step S12, when the first message is not received, repeating step S11;

step S12, converting the first message to the second message, and go to step S13; and step S13, send the second message and back to step S11.

3. The interconnecting device of claim 1, wherein the software further comprises an extract module configured to extract a command message and a non-command message of the first message.

4. The interconnecting device of claim 3, wherein the interconnecting device is configured to perform an interconnecting method comprising:

step S21, judging whether the first message is received, when the first message is received, go to step S22, when the first message is received, repeating step S21;

step S22, extracting the command message of the first message, and go to step S23;

step S23, converting the command message to the second message, and go to step S24; and step S24, send the second message and back to step S21.

5. The interconnecting device of claim 3, wherein the interconnecting device is configured to perform an interconnecting method comprising:

step S21, judging whether the first message is received, when the first message is received, go to step S22, when the first message is not received, repeating step S21;

step S22, extracting the command message and the non-command message of the first message, and go to step S23;

step S23, converting the command message to the second message, and go to step S24;

step S24, send the second message, and go to step S25; and step S25, converting the non-command message to a third message that can be known by another one of the first IOT platform, the second IOT platform, and the intelligent robot, send the third message, and back to step S21.

6. The interconnecting device of claim 3, wherein the interconnecting device is configured to perform an interconnecting method comprising:
   step S20, judging whether the first message is received, when the first message is received, go to step S21, when the first message is not received, repeating step S20;
   step S21, judging whether the first message comprises the command message, when the first message comprises the command message, go to step S22, when the first message does not comprise the command message, back to step S20;
   step S22, extracting the command message of the first message, and go to step S23;
   step S23, converting the command message to the second message, and go to step S24; and
   step S24, send the second message and back to step S21.

7. The interconnecting device of claim 1, wherein the interconnecting device is an intelligent mobile phone, a tablet computer, a note book computer, a desktop computer, a tiny computer, or the intelligent robot.

8. The interconnecting device of claim 1, wherein the first IOT platform and the second IOT platform have a communication mechanism to publish a topic and subscribe a topic.

9. The interconnecting device of claim 1, wherein each of the first IOT platform and the second IOT platform is one of a Thread IOT platform, an AllJoyn IOT platform, an OIC IOT platform and a Bonjour IOT platform, and the first IOT platform and the second IOT platform are different.

10. The IOT system of claim 1, wherein the first IOT platform and the second IOT platform have a communication mechanism to publish a topic and subscribe a topic.

11. The IOT system of claim 1, wherein each of the first IOT platform and the second IOT platform is one of a Thread IOT platform, an AllJoyn IOT platform, an OIC IOT platform and a Bonjour IOT platform, and the first IOT platform and the second IOT platform are different.

12. An internet of things (IOT) system, comprising an interconnecting device, a first IOT platform, a second IOT platform, and an intelligent robot; the interconnecting device is configured to interconnect any two of the first IOT platform, the second IOT platform, and the intelligent robot, and the interconnecting device comprising a software and a hardware configured to run the software; wherein the software comprises:
   a control module configured to control the interconnecting device;
   a communication module configured to communicate with one of the first IOT platform, the second IOT platform and the intelligent robot;
   a conversion module configured to convert a first message from one of the first IOT platform, the second IOT platform, and the intelligent robot to a second message that can be known by another one of the first IOT platform, the second IOT platform, and the intelligent robot; and
   a detecting module configured to detect whether a starting command or a stopping command is received; wherein the interconnecting device is configured to perform an interconnecting method comprising:
   step S30, detecting whether the starting command is received, when the starting command is received, go to step S31, when the starting command is not received, repeating step S30;
   step S31, judging whether the first message is received, when the first message is received, go to step S32, when the first message is not received, repeating step S31;
   step S32, converting the first message to the second message, and go to step S33;
   step S33, send the second message and go to step S34;
   step S34, detecting whether the stopping command is received, when the stopping command is received, back to step S30, when the stopping command is not received, back to step S31.

13. The IOT system of claim 12, wherein the interconnecting device is configured to perform an interconnecting method comprising:
   step S11, judging whether the first message is received, when the first message is received, go to step S12, when the first message is not received, repeating step S11;
   step S12, converting the first message to the second message, and go to step S13; and
   step S13, send the second message and back to step S11.

14. The IOT system of claim 12, wherein the software further comprises an extract module configured to extract a command message and a non-command message of the first message.

15. The IOT system of claim 14, wherein the interconnecting device is configured to perform an interconnecting method comprising:
   step S21, judging whether the first message is received, when the first message is received, go to step S22, when the first message is not received, repeating step S21;
   step S22, extracting the command message of the first message, and go to step S23;
   step S23, converting the command message to the second message, and go to step S24; and
   step S24, send the second message and back to step S21.

16. The IOT system of claim 14, wherein the interconnecting device is configured to perform an interconnecting method comprising:
   step S21, judging whether the first message is received, when the first message is received, go to step S22, when the first message is not received, repeating step S21;
   step S22, extracting the command message and the non-command message of the first message, and go to step S23;
   step S23, converting the command message to the second message, and go to step S24;
   step S24, send the second message, and go to step S25; and
   step S25, converting the non-command message to a third message that can be known by another one of the first IOT platform, the second IOT platform, and the intelligent robot, send the third message, and back to step S21.

17. The IOT system of claim 14, wherein the interconnecting device is configured to perform an interconnecting method comprising:
   step S20, judging whether the first message is received, when the first message is received, go to step S21, when the first message is not received, repeating step S20;
   step S21, judging whether the first message comprises the command message, when the first message comprises the command message, go to step S22, when the first message does not comprise the command message, back to step S20;

step S22, extracting the command message of the first message, and go to step S23;

step S23, converting the command message to the second message, and go to step S24; and step S24, send the second message and back to step S21.

18. The IOT system of claim 12, wherein the interconnecting device is an intelligent mobile phone, a tablet computer, a note book computer, a desktop computer, a tiny computer, or the intelligent robot.

19. The IOT system of claim 12, further comprising the first IOT platform, the second IOT platform and the intelligent robot.

* * * * *